United States Patent [19]
Senior, Jr. et al.

[11] Patent Number: 5,145,322
[45] Date of Patent: Sep. 8, 1992

[54] PUMP BEARING OVERHEATING DETECTION DEVICE AND METHOD

[75] Inventors: Roy F. Senior, Jr., 3736 E. Montecito, Phoenix, Ariz. 85018; Charles T. Lyon, Phoenix, Ariz.

[73] Assignee: Roy F. Senior, Jr., Phoenix, Ariz.

[21] Appl. No.: 725,199

[22] Filed: Jul. 3, 1991

[51] Int. Cl.⁵ ............................................. F04B 49/02
[52] U.S. Cl. ...................................... 417/32; 417/13; 417/63; 184/6.4; 374/153
[58] Field of Search ................. 417/32, 13, 63; 184/6.4, 108; 374/153, 141, 138, 135; 340/682, 596

[56] References Cited

U.S. PATENT DOCUMENTS

| | | | |
|---|---|---|---|
| 2,089,369 | 8/1937 | Heckert | 308/624 |
| 2,166,404 | 7/1939 | Hait | 417/63 |
| 2,961,875 | 11/1960 | Reumund | 340/682 |
| 3,052,123 | 9/1962 | Gustafson . | |
| 3,232,519 | 2/1966 | Long | 417/13 |
| 3,248,938 | 5/1966 | Hill et al. | 417/63 X |
| 3,426,962 | 2/1969 | Shaw | 417/13 |
| 3,548,396 | 12/1970 | Roberts | 340/682 |
| 3,648,522 | 3/1972 | Hafeli et al. | 374/153 X |
| 3,824,579 | 7/1974 | Waseleski, Jr. | 340/682 |
| 3,926,053 | 12/1975 | Schurrer | 374/153 X |
| 4,074,575 | 2/1978 | Bergman et al. | 340/682 |

FOREIGN PATENT DOCUMENTS

| | | | |
|---|---|---|---|
| 39801 | 3/1977 | Japan | 417/32 |

*Primary Examiner*—Leonard E. Smith
*Attorney, Agent, or Firm*—Charles E. Cates

[57] ABSTRACT

A deep well water pump system has a temperature probe (17) in the air space above the top bearing (12), preferably in the oil inlet chamber (26), and provides means for signalling abnormal temperatures to warning and system shutdown means. A method of detecting bearing overheating indirectly by sensing the shaft temperature and/or the temperature in the enclosed air space above the bearing is disclosed.

20 Claims, 2 Drawing Sheets

PUMP BEARING OVERHEATING DETECTION DEVICE AND METHOD

The present invention is a method and apparatus for detecting bearing overheating in oil-lubricated vertical turbine pumps, and for giving warning and shuting down water well vertical pumps.

BACKGROUND

A problem associated with well vertical pumps and their rotating parts is the overheating of bearings in which the parts rotate. Bearing overheating may be the result of (1) the breaking down of the chemical integrity of a lubricant with a consequent loss of lubricating qualities or (2) the interruption of the flow of lubricant through narrow passages through the bearings and packings.

In the latter case, for instance in a typical well pump system, the needle valve that regulates the flow of oil in the oil-lubricated, vertical turbine pump becomes clogged easily. The oil is gravity fed from an oil container drum and regulated through a sight gauge by an adjustable needle valve to provide a flow of approximately 6 to 8 drops per minute. It is delivered to the top bearing of the well through a ¼" copper tube and then through grooves cut in the top bearing and the rest of the well bearings, which are spaced at five foot intervals, all the way down to the bottom of the well where the pump bowls are located. The needle valve regulator is sensitive to moisture, dust and various foreign particles that are present in farm environments, all of which cause clogging in the needle valve. The consequent loss of oil flow causes increased friction which, in turn, permits the pump shaft and bearings to overheat. Sixty-five minutes after the lubricant flow interruption, temperatures in a lineshaft may exceed 400 F. (the flash point of common motor oils), causing residual oil in the shaft to vaporize. If the pump continues operation thereafter without lubrication the bearing temperature will exceed 1100 F. in less than one hour, causing a typical bronze bearing to experience massive wear very quickly and to flake off into the oil chamber and onto the bearing below, resulting in pump shaft failure.

Pump shaft failure involves expensive repairs and loss of service while the well is down. For example, in agriculture, crucial periods in crop growth require a constant supply of irrigation water; consequently, any significant loss of water supply at such times results in partial or complete crop failure Prior art patents offer some suggestions for dealing with the problem of bearing failure resulting from excessive temperature. Heckert (U.S. Pat. No. 2,089,369) described an overheated bearing and journal detection and identification system associated with wheel axles of railway cars. Heckert's heat detection system relied on the melting point of a fusible closure disk intimately associated with a journal box and a bearing.

Others have resorted to the use of various temperature sensing means imbedded in the bearing itself or, alternatively, in the bearing housing support to detect and monitor bearing temperatures (Waseleski et al, 3,824,579; Bergman et al 4,074,574; Gustafson 3,052,123; Reumund 2,964,875). However, because bearings associated with well pumps are located within oil tube lineshaft encasements surrounded by flowing water, temperature sensors embedded in such bearings may be inaccurate and their temperature readings unreliable. Even the flow of water below the bearing affects the temperature perceived by a sensor embedded in the bearing. Sometimes a packing heats up instead of a bearing, but a sensor imbedded in the bearing is not sensitive to the packing temperature, and it is not practical to embed a sensor in the packing.

FEATURES OF THE INVENTION

It is an object of this invention to overcome the problems of the prior art and provide an inexpensive, accurate method of early detection and system shutdown in the presence of abnormal temperatures before bearing damage or pump failure occurs, saving costly repair bills and preventing loss due to water supply interruption. The various features and advantages of this invention are:

A means and method for detecting bearing and packing temperature changes indirectly is provided;

The device of this invention may be retrofitted to an existing pump or incorporated into original equipment manufacture;

The device of this invention may be adapted to remote temperature monitoring and remote audio or visual warning;

The invention uses existing energy sources;

The invention may be incorporated in a customized temperature warning device adaptable to any bearing composition with readjustable temperature warning set points.

Other objects and features of this invention will appear to persons skilled in the art as the description unfolds.

BRIEF DESCRIPTION OF THE INVENTION

The present invention provides a method of use and a device having temperature sensing or detecting means, such as a temperature probe, disposed in the air space above the first line shaft pump bearing at a point where it is not materially affected by water flowing through the pump. Alternatively, the probe may be disposed in the oil inlet chamber or in the air space between the shaft and the oil tube wall, just above the top bearing.

The temperature sensing means is operatively connected to a temperature monitoring means with a selected alarm point that signals an abnormal rise in the air space temperature to alert pump operators that a bearing is overheating. Corrective actions may then be taken before the pump fails.

Alternatively, a limiting temperature set point is used as a failsafe mechanism to signal a switch that automatically shuts down the pump when the detection means signals a temperature in the air space exceeding a predetermined value, thus preventing bearing damage and consequent pump failure.

A signal, responsive to a predetermined temperature valve, is generated by a temperature sensing means and sent from the well to a switch having a limiting temperature set point. The set point is responsive to a pre-set maximum emergency temperature. The signal energizes a red warning light and a switch to shut down the pump motor before any damage can occur to the pump shaft and bearings. The switch acts as a fail safe mechanism to protect the well shaft and bearings from damage.

In one embodiment, the signal means is a warning light visible from a distance. In another embodiment the signal operates a remote switch that shuts down the pump motor, and may also operate a remote warning device to alert the pump operators to the overheating bearig.

The method involves the step of measuring the temperature of the air space above the top bearing and giving an alarm and/or shutting down the pump system at a predetermined value when an abnormal temperature is detected.

BRIEF DESCRIPTION OF THE DRAWINGS

Turning now to the drawings, wherein a presently preferred embodiment of the invention is shown.

DETAILED DESCRIPTION OF THE PREFERRED EMBODIMENTS

The present invention is based on the discovery that the top bearing in a vertical well pump system fails first, producing an increase in heat in and around the pump-shaft immediately above the top bearing in the stuffing box, and upon the further discovery that one may reliably detect an overheated bearing by taking the temperature of the air space above the top bearing. A temperature sensing means disposed in the air space above the top bearing can be used to monitor the shaft temperature, which has a significant relationship to bearing temperature, thus providing indirectly an inexpensive, reliable warning of an overheating bearing.

Although persons skilled in the art will recognize that the invention of this disclosure may be incorporated in original pump equipment systems for many different uses, it is also ideally suited to the retrofit modification of existing pump systems, and the description that follows is couched in terms of a retrofit application to an existing vertical pump installation.

Figure 1:
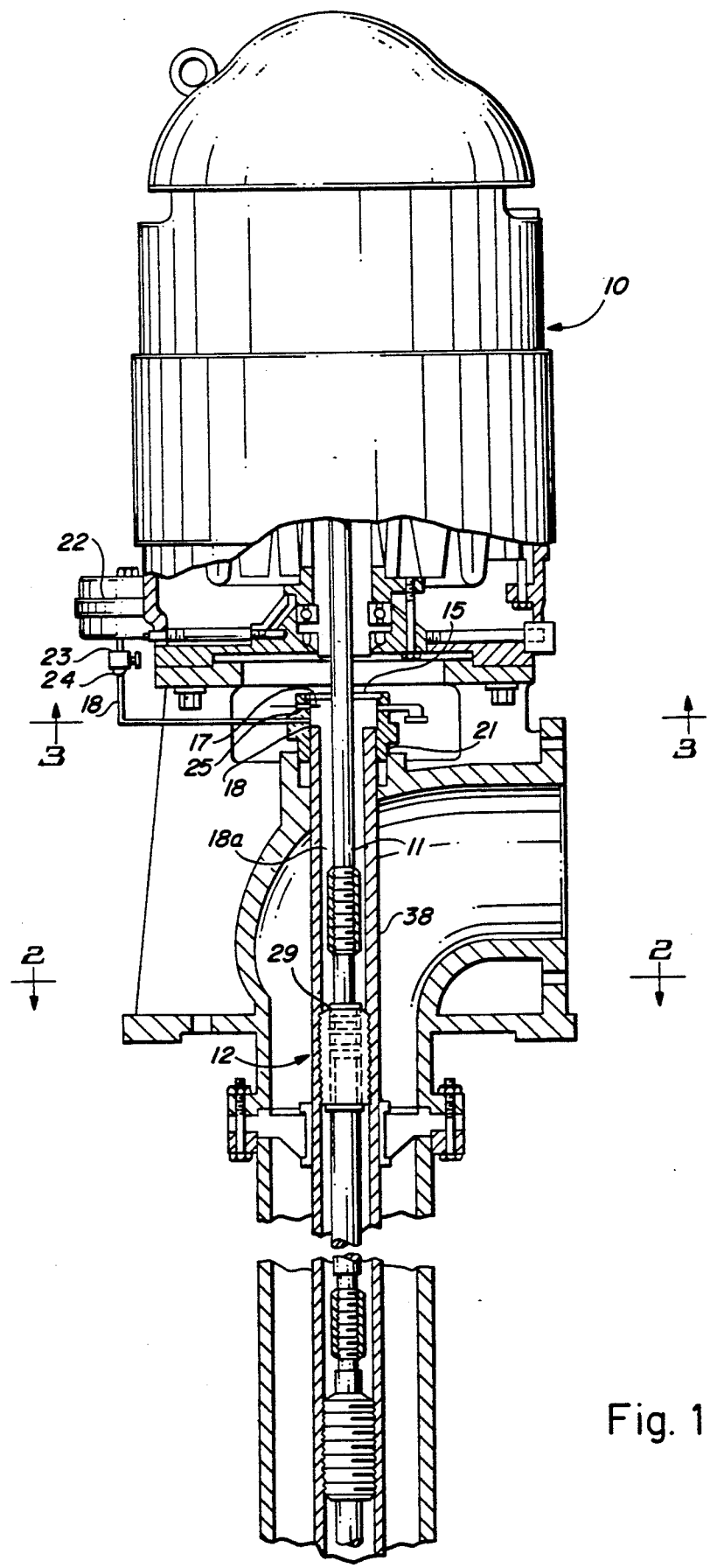
FIG. 1 is an elevation view of a pump and well apparatus, partially broken away to show interior details, that is retrofitted with the detection device herein disclosed.
Figure 2:
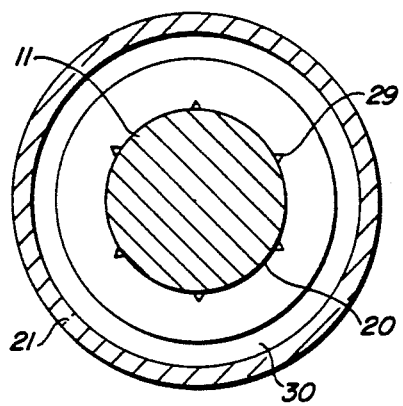
FIG. 2 is a section of the view of FIG. 1, taken along the lines 2—2.

Referring now to figures 1 and 2, in a typical vertical pump well system wherein a lubricant is gravity fed from an oil delivery reservoir 22 serving the production well vertical pump system 10, and regulated through a sight gage 24 by an adjustable needle valve oil regulator 23 providing an oil flow measured in drops per minute, oil is delivered through a copper tube 13 passing through the oil tube packing nut 21 to the top bearing 12 of the pump line shaft 11. As seen in FIG. 2, the oil then seeps through grooves 29 cut in the bearings 12 and through the remaining line shaft bearings 20, (not shown, but spaced at five foot intervals along the pump line shaft 11, to the bottom of the well where the pump bowl is located).

Figure 3:
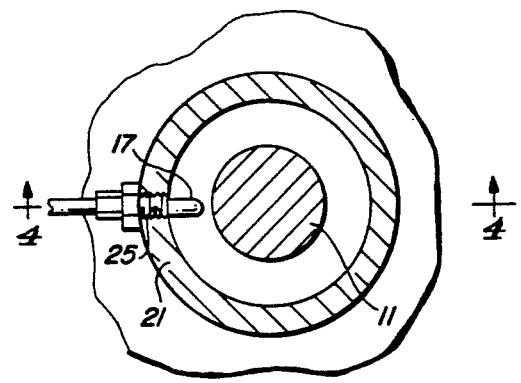
FIG. 3 is a section of the view of FIG. 1, taken along the lines 3—3.
Figure 4:
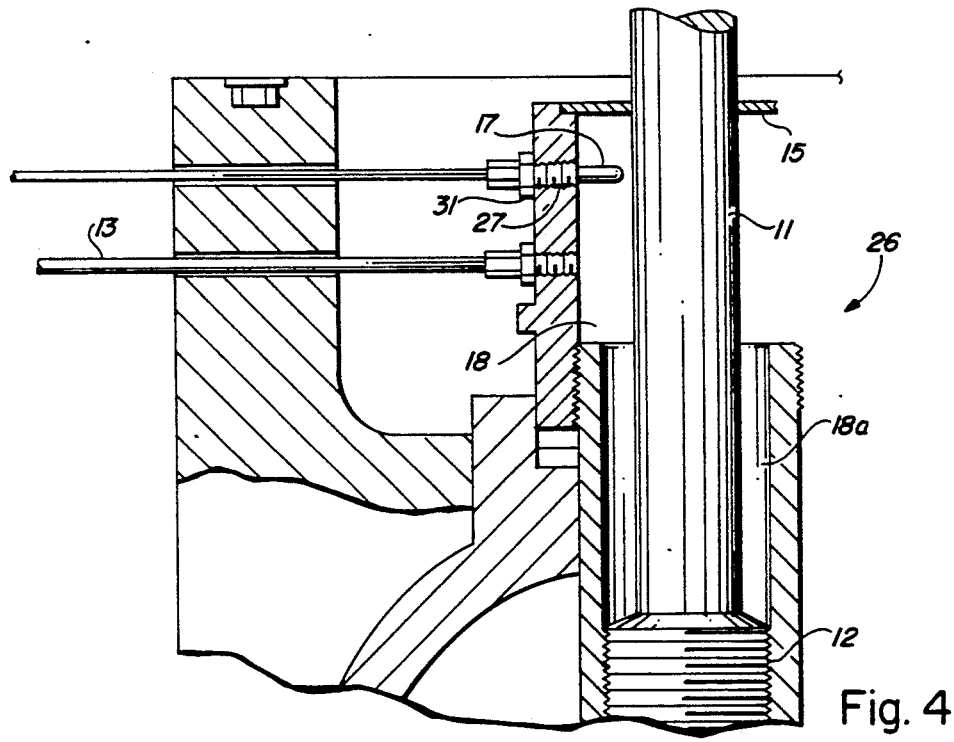
FIG. 4 is an enlarged portion of the view of FIG. 1.
Figure 5:
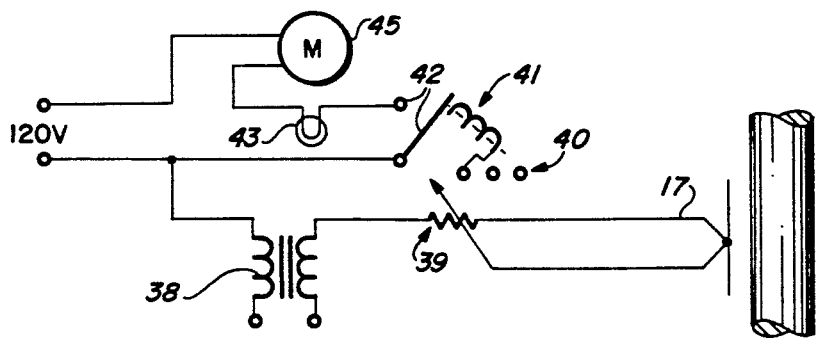
FIG. 5 is a schematic drawing of the electrical circuit used in a presently preferred embodiment of the invention.

Referring additionally to FIGS. 3 and 4, a temperature probe 17, provided according to this invention, is mounted in a bore 25 in the oil tube packing nut 21 and opening to an air space 18 communicating between the oil inlet chamber 26 below the dust seal packing 15 and the oil tube space 18a. The bore opening 25, tapped in the wall of the oil inlet chamber 26, is fitted with a brass collar 27. The probe 17 is inserted in the collar 27 and secured in place by a collet 31. A type "E" thermocouple probe 17 encased in a protective stainless steel tube is set ⅛ inch from the pump shaft 11 by first touching the shaft and then backing it off the required distance FIG. 5 shows a simple relay circuit responsive to temperatures sensed by the type "E" thermocouple probe 17. A power source (not shown) supplies standard 110-120 volt power which is stepped down to 12-24 volts by a step-down transformer 38 to supply a type "E" thermocouple probe 17.

As the resistance of the type "E" thermocouple probe 17 decreases responsive to an increase in oil inlet chamber 26 temperature, more voltage is applied across the variable resistor 39 to a point where there is current flow through the gate-cathode junction of the silicon controlled rectifier 40 during positive half cycles applied to the anode thereof, thereby causing a full alternating current signal to be applied across the relay coil 41 which energizes the relay.

When the type "E" thermocouple probe 17 senses a sufficiently high temperature and the silicon controlled rectifier 40 is conductive to the point of energizing the relay coil 41, a pair of normally open contacts 42 are closed and a warning light 43 is then energized through the closed contacts, indicating the limiting temperature has been reached, and simultaneously shutting down the pump motor.

Adjustments of the variable resistor may be accomplished with a set point potentiometer serving to adjust the level at which the silicon controlled rectifier 40 becomes conductive. The potentiometer can be located at a point remote from the bearing which makes it possible for the type "E" thermocouple probe 17 to be operated over a wide range of temperatures.

In an optional embodiment, the temperature probe 17, which is connected to a temperature monitoring instrument as in the first embodiment, may be extended downward into the air space 18a between the shaft 11 and the oil tube 30 to a point above the top bearing, preferably ⅛ inch above it. Located in either position the limiting temperature set point may be computed and set by persons skilled in art, without undue experimentation, with reference to the composition of the bearings used in the pump shaft system.

In some circumstances an optional embodiment may be desired to include a pre-shutdown warning light. A first signal, responsive to a predetermined increase in temperature, may be generated by the type "E" thermocouple probe 17 and sent from the well to a switch having two limiting temperature set points. The first set point may be responsive to a slight increase in temperature operating ranges above normal, turning on an amber light so that a caretaker may take early corrective action before the pump shuts down and interrupts the flow of water. If the temperature continues to rise, a second set point, responsive to a pre-set maximum (emergency) temperature shuts down the pump a described above.

Various alternative equivalent means and structures will suggest themselves to persons skilled in the art from a study of this specification which sets forth the presently preferred embodiments. The invention, however, is limited only by the attached claims and equivalents thereof.

What is claimed is:

1. In combination with a deep well water pump system having: a column pipe for water flow; an oil tube concentrically disposed within the pipe; a pump shaft concentrically disposed within the tube; bearings around said shaft whereby an air space which communicates with an oil inlet chamber having an air space therein is maintained around said shaft; and a motor to operate said pump shaft between said bearings; a warning device for detecting the overheating of a bearing, comprising:

a temperature probe disposed in the air space above the first bearing in said oil tube for indirectly detecting a rise in temperature in the bearings, and means for signalling a rise in temperature to a predetermined maximum value.

2. The apparatus of claim 1 further comprising means for deenergizing the motor system responsive to the signalling of said temperature value.

3. The apparatus of claim 2 comprising means for sending said signal to a remote receiver.

4. Apparatus of claim 2 comprising second signal means responsive to a rise in temperature to a second predetermined maximum value and means for deenergizing the pump system responsive to said second signal.

5. The apparatus of claim 1 comprising means for sending said signal to a remote receiver.

6. Apparatus of claim 5 comprising second signal means responsive to a rise in temperature to a second predetermined maximum value and means for deenergizing the pump motor responsive to said second signal.

7. Apparatus of claim 1 comprising second signal means responsive to a rise in temperature to a second predetermined maximum value and means for deenergizing the pump motor responsive to said second signal.

8. The apparatus of claim 7 comprising means for sending said signals to a remote receiver.

9. A deep well water pump system comprising: a column pump for water flow, an oil tube concentrically disposed within the pipe, a pump shaft concentrically disposed within the tube, bearings around said shaft, whereby an air space which communicates with an oil inlet chamber having an air space therein is maintained around said shaft, motor means for rotating the shaft above the topmost bearing, and a warning device for detecting temperatures in said shaft related to the overheating of said bearings comprising a temperature probe disposed in said air space above in close proximity to said shaft and means for signalling a rise in temperature to a predetermined maximum value.

10. The apparatus of claim 1 further comprising means for deenergizing the pump system responsive to the signalling of said maximum temperature value.

11. The apparatus of claim 10 comprising means for sending said signal to a remote receiver.

12. A method for detecting bearing overheating in a deep well water pump system having: a column pipe for water flow, an oil tube concentrically disposed within the pipe, a pump shaft concentrically disposed within the tube, bearings around said shaft, whereby an air space which communicates with an oil inlet chamber having an air space therein is maintained around said shaft between and above said bearings; the step of detecting the overheating of said bearings indirectly by measuring the temperature in the air space above the top bearing in said oil tube.

13. The method of claim 12 further comprising the step of stopping the operation of the pump system when said rise in temperature to a predetermined value is detected.

14. The method of claim 12 wherein said temperature is measured in close proximity to the shaft.

15. The method of claim 12 wherein said temperature is measured in close proximity to the shaft and the bearing.

16. The method of claim 12 comprising the steps of correlating the temperature ranges of air, shaft and top bearing and providing means to signal a warning when a predetermind temperature is reached.

17. A deep well water pump system comprising: a column pump for water flow, an oil tube concentrically disposed within the pipe, a pump shaft concentrically disposed within the tube, bearings around said shaft, whereby an air space which communicates with an oil inlet chamber having an air space therein is maintained around said shaft, motor means for rotating said shaft above the topmost bearing, and a warning device for detecting temperatures in said air space shaft related to the overheating of said bearings comprising means for remotely sensing the temperature of said shaft, and means for signalling temperature of a predetermined maximum value.

18. The apparatus of claim 17 further comprising means for deenergizing the pump system responsive to the signalling of said maximum temperature value.

19. The apparatus of claim 17 comprising means for sending said signal to a remote receiver.

20. Apparatus of claim 17 comprising second signal means responsive to a rise in temperature to a second predetermined maximum value and means for deenergizing the pump system responsive to said second signal.

* * * * *

UNITED STATES PATENT AND TRADEMARK OFFICE
CERTIFICATE OF CORRECTION

PATENT NO. : 5,145,322
DATED : September 8, 1992
INVENTOR(S) : Senior, Jr. et al It is certified that error appears in the above-identified patent and that said Letters Patent is hereby corrected as shown below:

In claim 17, column 6, line 35, "shaft" is deleted.

Signed and Sealed this

Nineteenth Day of October, 1993

Attest:

BRUCE LEHMAN

*Attesting Officer*  Commissioner of Patents and Trademarks

UNITED STATES PATENT AND TRADEMARK OFFICE
CERTIFICATE OF CORRECTION

PATENT NO. : 5,145,322
DATED : September 8, 1992
INVENTOR(S) : Roy F. Senior, Jr., et al It is certified that error appears in the above-indentified patent and that said Letters Patent is hereby corrected as shown below:

Column 6, line 35, "shaft" is deleted.

Signed and Sealed this

Eighteenth Day of January, 1994

Attest:

BRUCE LEHMAN

Attesting Officer     Commissioner of Patents and Trademarks